Patented July 5, 1949

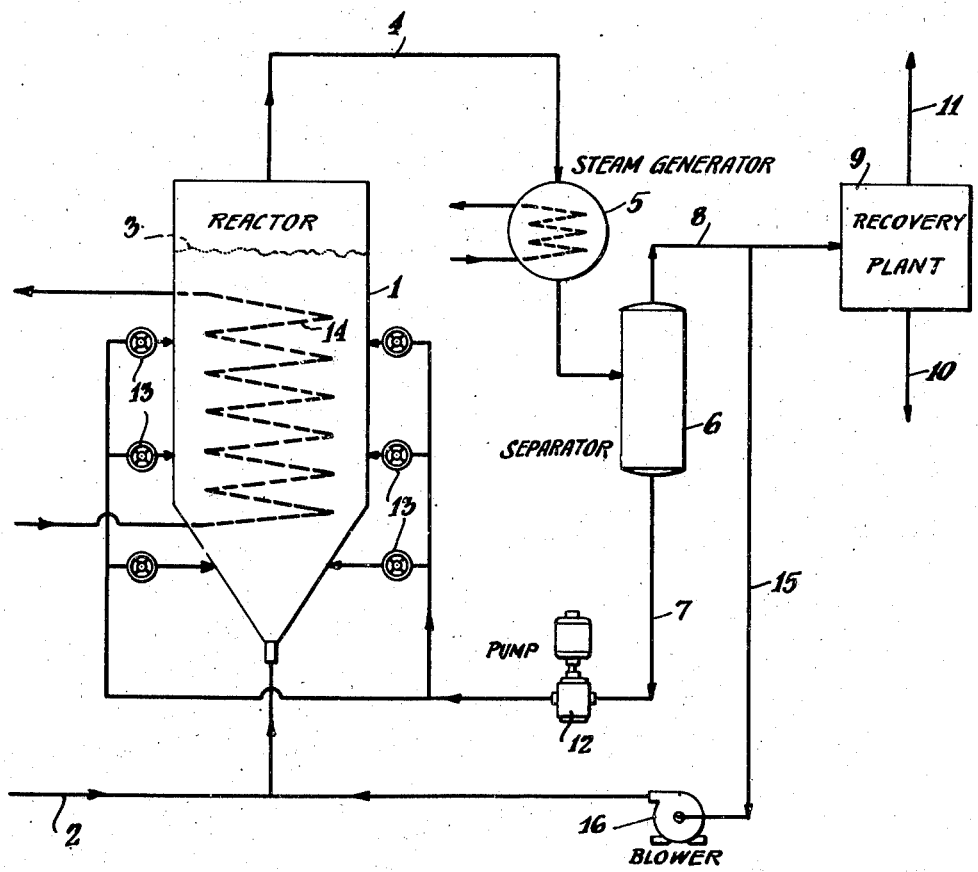

2,474,845

UNITED STATES PATENT OFFICE 2,474,845

PROCESS FOR SYNTHESIZING HYDROCARBONS

Frank J. Jenny, New York, N. Y., and Earl W. Riblett, Tenafly, N. J., assignors to Hydrocarbon Research, Inc., New York, N. Y.

Application September 12, 1944, Serial No. 553,750

5 Claims. (Cl. 260—449.6)

The invention is directed to the synthesis of hydrocarbons through the reactions of carbon monoxide and hydrogen, and more particularly to the synthesis of liquid hydrocarbons of the type adaptable for use as a motor fuel such as gasoline.

Since the early investigation of the process for the hydrogenation of carbon monoxide as disclosed, for example, in U. S. Patent No. 1,746,464 to Fischer and Tropsch, attention has been focused on the prime problem of removing the considerable quantities of exothermic energy of the reaction. This problem is all the more difficult when it is realized that the temperature must not vary substantially from a predetermined operating temperature. An increase in temperature of as little as 5° to 10° F. may affect the product distribution adversely and result in an increase in the rate of reaction so that a vicious circle of rising temperature is initiated. As the temperature climbs, the reaction shifts to the synthesis of methane and other undesirable products with consequent lowering of the yield of the more valuable liquid hydrocarbons.

Numerous processes have been proposed to overcome these and attendant difficulties, but, to our knowledge, none have been found satisfactory for operation in large-scale equipment or feasible from the viewpoint of economics.

A prime object of our invention is to provide a novel and simple process for reacting carbon monoxide and hydrogen to form liquid hydrocarbons.

Another principal object is to provide a synthesis process which is both operable and practical in large-scale commercial plants.

A further object is to control the reaction temperature in an easy but effective manner.

Still another object is to conduct the hydrocarbon synthesis in a minimum of equipment which is simple and cheap.

Other objects of our invention will be apparent in the description which follows.

We have found that the synthesis of hydrocarbons from carbon monoxide and hydrogen can be conducted in a surprisingly simple manner which also affords means for attaining sensitive thermal control. Our process involves passing synthesis gas, i. e., carbon monoxide and hydrogen, under reacting and fluidizing conditions through a mass of powdered catalyst prepared from metals of the iron group, preferably iron itself, withdrawing and cooling the reaction gases to separate a liquid fraction, and injecting the liquid fraction into the mass of powdered catalyst to maintain good fluidization and to effect close temperature control. The reaction gases which remain uncondensed at the stage where the liquid fraction is taken for recycling to the reactor proceed to a recovery plant in which desired products are collected by conventional fractionation procedures.

The technique of fluidization which has gained prominence in the petroleum industry as a method for conducting reactions between gases and finely divided solids has been broadly suggested for various other reactions, e. g., the conversion of coal to gas. It will be noted that in such operations as petroleum cracking and coal gasification, the material undergoing processing yields increased volumes of gas in the reaction zone. The conversion of synthesis gas to hydrocarbons, on the other hand, leads to a substantial contraction of the order of 50% in the volume of gas as it passes up through the reactor. This is very detrimental to the operation of a dense-phase fluid system.

While in U. S. Patent 1,984,380 directed to a fluid process of producing chemical reactions, Odell proposes the synthesis of hydrocarbons by the passage of mixtures of hydrogen and carbon monoxide through a mass of fluidized particles of iron-copper catalyst, he does not suggest how proper fluidization of the catalyst mass is to be attained in spite of the substantial contraction of the gases flowing through the mass. Furthermore, Odell teaches that increasing the velocity of the fluid decreases the time and the intimacy of its contact with the catalyst and therefore decreases the amount of reaction and the temperature rise. From the chemical engineering point of view such a method of temperature regulation is distinctly undesirable and inefficient. Also, recourse to a high gas velocity is fundamentally at cross purposes with the fluidization technique which is especially designed to enhance the intimacy of contact between gases and finely divided solids. Alternatively, Odell discloses that the temperature may be controlled by circulating the fluidized catalyst through a cooling system. The removal of heat from this highly exothermic synthesis by circulation of the heavy mass of catalyst would involve the expenditure of considerable energy. In our process, cooling by the recycling of liquid to the reaction zone involves an expenditure of energy equivalent to that required by Odell for cooling the catalyst after it is withdrawn from the reaction zone. Accordingly, our process enjoys a net gain equal to the energy that would be expended in circulating the catalyst. Moreover, the circulation of catalyst necessitates more equipment and more catalyst and subjects both to high erosion.

By dense-phase fluidization, we mean passing gas or vapor up through a mass of powdered material at such a velocity that the powder becomes suspended in the gas but exhibits what has been termed "hindered settling." While the gas velocity is sufficient to cause turbulence and seething of the powdered mass so that it resembles a boiling liquid, it is, nevertheless, low enough so that there is relatively little entrainment of the powder in the gases discharging from the reactor. With dense-phase fluidization, a pseudo-liquid level is established between the fluidized mass and the gas space above it.

The direct application of dense-phase fluidization in the commercial production of synthetic hydrocarbons is all the more impractical when it is desired to pass the synthesis gas through the reactor at low velocities. The influence of gas contraction on fluidization is particularly marked at low gas velocities. The contraction of carbon monoxide and hydrogen molecules into fewer but larger molecules of hydrocarbons, as these gases travel up through a mass of catalyst, creates uneven fluidization along the vertical dimension of the reactor. Thus, in the vicinity of the bottom of the reactor where the synthesis gas is introduced, the catalyst mass is in a very fluid and turbulent state which diminishes as the reaction gases ascend until the upper portion of the mass of catalyst powder is comparatively quiescent. Because of the very low gas velocity in the upper portion of the mass, there is a tendency for the mass to become deaerated, i. e., the catalyst mass tends to pack and form channels through which the gases escape without making proper contact with the catalyst. Marked temperature differences are observable in the upper and lower portions of the catalyst mass. It is as if the fluid reaction zone were divided into two portions having little mixing of their powdered masses. This tendency not only nullifies the prime purpose of employing fluidization, which is to maintain uniform temperature throughout the reaction zone, but also makes heat transfer to cooling surfaces disposed within the upper portion of the reaction mass very poor.

These operational obstacles are overcome and additional advantages realized when, as we have discovered, liquid hydrocarbons recovered from the reaction gases are injected into the reaction zone and revaporized by contact with the hot catalyst powder to provide sufficient gas to equalize fluidization and simultaneously to absorb substantial quantities of heat from the reaction zone.

To clarify further the operation of our process, reference is made to a typical embodiment represented diagrammatically in the drawing attached to this specification.

Synthesis gas enters the reactor 1 through pipe 2 and passes up through a fluidized mass of powdered iron catalyst which has a pseudo-liquid level 3. The pseudo-liquid level is the region wherein the bulk of the reaction gases become disengaged from the comminuted catalyst prior to escape from the reactor. The reaction gases carrying a limited quantity of catalyst powder flow out through pipe 4 and steam generator 5 or equivalent heat remover into separator 6. The liquified fraction of the reaction products is withdrawn from separator 6 through pipe 7 while the uncondensed fraction passes overhead through pipe 8 to recovery plant 9 wherein various liquid hydrocarbon products are separated and withdrawn as shown at 10 and residual noncondensable gases, chiefly carbon dioxide, are vented at 11. Any desired proportion of these gases may be returned to the generator (not shown) for the production of synthesis gas. Pump 12 is used to inject liquid hydrocarbons into the reactor through a multiplicity of valved inlets 13. The liquid is preferably atomized so that it is immediately converted to vapor within the mass of fluidized catalyst. It will be noted that while the ascending reaction gas diminishes in volume along the vertical dimension of the reactor, the volume of the vapors from the injected liquid hydrocarbons increases so that a compensating effect is realized with the result that there is a fairly uniform rate of fluidization along the entire height of the reaction mass. This generally uniform condition of fluidity and turbulence permits the attainment of very sensitive thermal regulation, i. e., variations of as little as 5° to 10° F. within the reaction mass are avoided. Moreover, good fluidization makes possible a relatively high rate of heat transfer from the reaction mass to the cooling surface, represented as coil 14. Obviously, any improvement in the rate of heat transfer is translatable into a reduction in the size of the equipment and this in turn is an important consideration in commercial operations. In addition, the introduction and vaporization of liquid hydrocarbons provide a very convenient and practical procedure for removing considerable quantities of exothermic energy from the reaction zone. As a matter of fact, we have found that it is possible to choose operating conditions so that the entire heat of reaction may be borne out of the reactor by the reaction gases and vaporized liquid hydrocarbons. Under such conditions, the cooling coil 14 or other suitable heat exchange device within the reactor 1 may be eliminated. As shown in the drawing, a portion of the uncondensed reaction products are bled from pipe 8 and returned by way of pipe 15 and blower 16 to the reactor for the further conversion of residual carbon monoxide and hydrogen into hydrocarbon products. We prefer to pass these gases through a condenser in order to precipitate another fraction of liquid hydrocarbons and to remove water of reaction prior to returning them through blower 16 to the reactor 1. This permits the recycling of a greater proportion of the unconverted synthesis gas than is possible when the liquefiable hydrocarbon products and water of reaction are not removed from this stream. Alternatively, the recycle gas may be drawn from line 11 after the various hydrocarbon products have been separated in the recovery plant 9. For the purposes of our invention, it is not necessary to recycle any gas at all to the reactor; all or none of the recycle gas may be put through the generator for the production of synthesis gas.

It will be noted that our process does not necessitate the cumbersome and expensive gas-solid separators, like cyclones or Cottrell precipitators, which are conventional accessories of fluid systems involving the circulation of solids or of disperse-phase systems involving the blowing of solids through a reactor. The unavoidably small proportion of catalyst powder which leaves the reactor by entrainment in the reaction gases is pulled down with the liquid hydrocarbons in separator 6 and the catalyst-oil slurry is pumped back to the reactor. If desired, a cyclone or other separator of very simple design may be placed at the outlet of reactor 1 to return the bulk of the entrained catalyst directly to the reactor; the catalyst remaining suspended in the reaction gases would be caught in separator 6 as has already been explained.

Further details of the process of our invention will be given, by way of example, in terms of a plant designed to produce daily 800 barrels of liquid hydrocarbons. The particular catalyst selected for this plant is iron powder of which all passes through a 200-mesh screen and about 85% passes through a 325-mesh screen. The latter fraction has a particle size distribution of fairly broad range. The catalyst is substantially pure iron into which about 1.0% of potassium oxide ($K_2O$) and about 2.0% of alumina ($Al_2O_3$) have been incorporated as promoters. With a reactor 12 feet in diameter and a pseudo-liquid level about 30 feet above the bottom of the reactor, synthesis gas having a carbon-monoxide:hydrogen ratio of about 3:4 and a temperature of 550° F. is fed into the reactor at the rate of 32,000,000 cubic feet per day. Recycle gas at a temperature of 450° F. is returned to the reactor at an equal rate of flow. This recycle gas has been passed through coolers and condensers which remove a considerable proportion of the liquid hydrocarbon products and substantially all the water of reaction. Carbon monoxide and hydrogen are present in the recycle gas in the ratio of about 1:1. Liquid hydrocarbons at a temperature of about 600° F. are injected at a rate of 32,000 barrels per day into the fluid mass from evenly distributed points to prevent flooding of the catalyst with oil in any part of the reactor. The recycle cooling oil carries catalyst powder which has been transported out of the reactor by entrainment in the effluent gases. Heat exchange surfaces are disposed within the reactor to take up residual (about 50%) exothermic energy which is not removed by the reaction gases and vaporized recycle oil. The reactor generates heat at a rate of the order of 70,000,000 B. t. u. per hour. The synthesis is conducted at a pressure of 250 pounds per square inch and at a temperature of 600° F. Under these operating conditions, the gases flowing through the reactor have a linear velocity of about 1 foot per second; with such a gas velocity there is sufficient fluidity and turbulence of the catalyst mass so that temperature differences of as little as 5° to 10° F. are avoided and a satisfactory rate of heat transfer to the cooling surfaces is attained. Besides, the quantity of catalyst carried out by entrainment and requiring replacement in the reactor is small. In the foregoing, references to gas volumes are for gases at standard conditions.

The liquid product of this fluid catalyst plant comprises about 80% of hydrocarbons boiling in the gasoline range, i. e., a fraction starting with hydrocarbons of four carbon atoms and ending at a boiling point of 400° F., and about 20% of hydrocarbons boiling above 400° F.

The catalyst employed in our process is an essential contributing factor for commercial operability. From this viewpoint, we prefer to use iron catalyst although catalysts of the other metals of the iron group, viz., cobalt and nickel, are well suited to our process and, in certain instances, may offer some advantages over iron. The catalyst is predominantly, i. e., at least 80%, a metal or a mixture of metals of the iron group. We are, of course, aware that various promoters and activators may be added to the iron group metals in minor proportions, i. e., not more than 20%, to modify the hydrocarbon synthesis reaction and thereby to yield different hydrocarbon products. Such promoters as compounds of alkali and alkaline earth metals, the oxides of titanium and silicon, and salts of molybdenum and chromium may be employed. Inasmuch as both components of synthesis gas, viz., hydrogen and carbon monoxide, are strong reducing agents, the powdered catalyst charged to the reactor may be in the form of any readily reducible compound or compounds of metals of the iron group.

The powdered catalyst used in our process is of such size or, more accurately stated, of such particle size distribution that, under the reaction conditions prevailing in the reactor, the gases passing up through a bed of the powder will render it fluid. While powders which are relatively coarse or relatively fine may be used in some cases, we generally choose 200- to 400-mesh powders. Such powders preferably have a predominant fraction, say 85%, passing through a 325-mesh screen and the particle sizes in this fraction are distributed over a fairly broad range. Instead of pulverizing the catalyst itself, the catalytic material may be deposited by known techniques on finely divided, inert supports like diatomaceous earth. Accordingly, powdered catalysts suitable for our fluid synthesis process embrace both the unsupported and the supported types.

A very important feature of the process of our invention is its great flexibility which readily permits operating variations to yield various distributions of liquid hydrocarbon products. Thus, when wax substitutes are in demand, the recycle oil may be fractionated so as to draw off any heavy, wax-like products which may be present. Under other circumstances, it may be desirable to recycle the heavier hydrocarbons since these tend to be converted in the reactor into lower boiling products and, accordingly, increase the yield of liquid hydrocarbons in the gasoline range. It is therefore clear that by simple fractionating means, interposed in the recycle oil line, the final product distribution may be altered to suit particular objectives.

It is generally advisable to regenerate the catalyst at such rate, either periodically or continuously, as to maintain the catalyst in the synthesis reactor at fairly constant and high activity. This may be accomplished by treating the catalyst which leaves the reactor by entrainment in the effluent gases and is recovered as an oil slurry. Alternatively, catalyst powder may be drained from the reactor through a draw-off pipe having its inlet in the fluid reactor below the pseudo-liquid level. In either case, the withdrawn catalyst is treated, e. g., with hydrogen under fluidizing and reacting conditions, to remove any poisons or deactivating subtances deposited on the catalyst particles. When wax-like products accumulate on the catalyst particles, they may be recovered by extracting the fouled catalyst with suitable solvent. After the catalyst is revivified by extraction and/or other treatment, it is returned to the fluid reactor used for the synthesis of hydrocarbons.

By the term, liquid hydrocarbons, we mean hydrocarbon molecules of not less than 4 carbon atoms. The liquid recovered from our synthetic process may contain varying quantities of oxygenated hydrocarbons such as alcohols, but these oxygenated compounds will usually amount to less than 10%. The noncondensable fraction of the reaction products, including carbon dioxide, methane, ethylene, etc., may be recycled to the generator for the production of synthesis gas, or it may otherwise be utilized.

The foregoing description and example are intended to be illustrative only. The several modifications of our invention, which will be apparent to those skilled in the art and which conform to the spirit of the invention, are to be considered within the scope of the claims.

What we claim is:

1. A process for effecting catalytic hydrogenation of carbon monoxide by reaction with hydrogen during passage through a mass of fluidized powdered synthesis catalyst disposed in a vertical reaction zone wherein the catalyst is maintained in a state of dense phase fluidization by the action of the gaseous fluid rising therethrough, the velocity of said gaseous fluid being sufficiently low so that there is relatively little entrainment of said powdered catalyst in the gases discharging from said reaction zone, which comprises continuously introducing carbon monoxide and hydrogen as gaseous reactants to the lower portion of said zone at a predetermined rate, passing the so-introduced reactants upwardly through said mass under predetermined conditions of temperature and pressure such that said reactants are substantially converted into compounds of higher molecular weight with substantial volume contraction of said gaseous reactants as they proceed therethrough, injecting added vaporizable liquid into said reaction mixture at a plurality of succeeding points spaced apart in the direction of reactant travel through the catalyst mass, and regulating the amount of vaporizable liquid injected so as to compensate for said contraction and maintain substantially even fluidization of said catalyst along the vertical dimension of said reaction zone.

2. A process for effecting catalytic hydrogenation of carbon monoxide by reaction with hydrogen to produce hydrocarbons during passage through a mass of fluidized powdered synthesis catalyst disposed in a vertical reaction zone wherein the catalyst is maintained in a state of dense phase fluidization by the action of the gaseous fluid rising therethrough, the velocity of said gaseous fluid being sufficiently low so that there is relatively little entrainment of said powdered catalyst in the gases discharging from said reaction zone, which comprises continuously introducing carbon monoxide and hydrogen as gaseous reactants to the lower portion of said zone at a predetermined rate, passing the so-introduced reactants upwardly through said mass under predetermined conditions of temperature and pressure such that said reactants are substantially converted into hydrocarbons with substantial volume contraction of said gaseous reactants as they proceed therethrough, continuously removing from the reaction zone an effluent stream comprising normally liquid hydrocarbons, separating from said stream liquid hydrocarbons vaporizable under the conditions prevailing within said reaction zone, injecting so-separated hydrocarbons into said reaction mixture at a plurality of succeeding points spaced apart in the direction of reactant travel through the catalyst mass, and regulating the amount of hydrocarbons injected so as to compensate for said contraction and maintain substantially even fluidization of said catalyst along the vertical dimension of said reaction zone.

3. A process for effecting catalytic hydrogenation of carbon monoxide by reaction with hydrogen to produce hydrocarbons during passage through a mass of fluidized powdered iron catalyst disposed in a vertical reaction zone wherein the catalyst is maintained in a state of dense phase fluidization by the action of the gaseous fluid rising therethrough, the velocity of said gaseous fluid being sufficiently low so that there is relatively little entrainment of said powdered catalyst in the gases discharging from said reaction zone, which comprises continuously introducing carbon monoxide and hydrogen as gaseous reactants to the lower portion of said zone at a predetermined rate, passing the so-introduced reactants upwardly through said mass at a temperature of about 600° F. and under a pressure of about 250 pounds such that said reactants are substantially converted into hydrocarbons with substantial volume contraction of said gaseous reactants as they proceed therethrough, continuously removing from the reaction zone an effluent stream comprising normally liquid hydrocarbons, separating from said stream liquid hydrocarbons vaporizable under the conditions prevailing within said reaction zone, injecting so-separated hydrocarbons into said reaction mixture at a plurality of succeeding points spaced apart in the direction of reactant travel through the catalyst mass, and regulating the amount of hydrocarbons injected so as to compensate for said contraction and maintain substantially even fluidization of said catalyst along the vertical dimension of said reaction zone.

4. A process for effecting catalytic hydrogenation of carbon monoxide by reaction with hydrogen during passage through a mass of fluidized powdered synthesis catalyst disposed in contact with cooling surfaces in a vertical reaction zone wherein the catalyst is maintained in a state of dense phase fluidization by the action of the gaseous fluid rising therethrough, the velocity of said gaseous fluid being sufficiently low so that there is relatively little entrainment of said powdered catalyst in the gases discharging from said reaction zone, which comprises continuously introducing carbon monoxide and hydrogen as gaseous reactants to the lower portion of said zone at a predetermined rate, passing the so-introduced reactants upwardly through said mass under predetermined conditions of temperature and pressure such that said reactants are substantially converted into compounds of higher molecular weight with substantial volume contraction of said gaseous reactants as they proceed therethrough, injecting a vaporizable liquid into said reaction mixture at a plurality of succeeding points spaced apart in the direction of reactant travel through the catalyst mass, and regulating the amount of vaporizable liquid injected so as to compensate for said contraction and to maintain a substantially uniform linear velocity of gaseous flow of about 1 foot per second through said catalyst mass thereby promoting a uniformly high rate of heat transfer to the cooling surfaces in contact with said fluidized catalyst.

5. A process for effecting catalytic hydrogenation of carbon monoxide by reaction with hydrogen to produce hydrocarbons during passage through a mass of fluidized powdered synthesis catalyst disposed in a vertical reaction zone wherein the catalyst is maintained in a state of dense phase fluidization by the action of the gaseous fluid rising therethrough, the velocity of said gaseous fluid being sufficiently low so that there is relatively little entrainment of said powdered catalyst in the gases discharging from said reaction zone, which comprises continuously introducing carbon monoxide and hydrogen as gaseous reactants to the lower portion of said zone at a predetermined rate, passing the so-introduced reactants upwardly through said mass under predetermined conditions of temperature and pressure such that said reactants are substantially converted into hydrocarbons with substantial volume contraction of said gaseous reactants as they proceed therethrough, continuously removing from the reaction zone an effluent stream comprising normally liquid hydrocarbons, separating from said stream liquid hydrocarbons vaporizable under the conditions prevailing within said reaction zone, injecting so-separated hydrocarbons into said reaction mixture at a plurality of succeeding points spaced part in the direction of reactant travel through the catalyst mass, and regulating the amount of hydrocarbons injected so as to compensate for said contraction and to maintain a substantially uniform linear velocity of gaseous flow of about 1 foot per second through said catalyst mass thereby promoting a uniformity high rate of heat transfer to the cooling surfaces in contact with said fluidized catalyst.

FRANK J. JENNY.
EARL W. RIBLETT.

REFERENCES CITED

The following references are of record in the file of this patent:

UNITED STATES PATENTS

| Number | Name | Date |
|---|---|---|
| 1,955,873 | Deanesly | Apr. 24, 1934 |
| 1,984,380 | Odell | Dec. 18, 1934 |
| 2,318,602 | Duftschmid | May 11, 1943 |
| 2,347,682 | Gunness | May 2, 1944 |
| 2,383,636 | Wurth | Aug. 28, 1945 |
| 2,406,851 | Redcay | Sept. 3, 1946 |